(12) United States Patent
Kan et al.

(10) Patent No.: US 8,301,603 B2
(45) Date of Patent: Oct. 30, 2012

(54) INFORMATION DOCUMENT SEARCH SYSTEM, METHOD AND PROGRAM FOR PARTITIONED INDEXES ON A TIME SERIES IN ASSOCIATION WITH A BACKUP DOCUMENT STORAGE

(75) Inventors: Masaki Kan, Tokyo (JP); Yoshihiro Kajiki, Tokyo (JP); Satoshi Yamakawa, Tokyo (JP); Takashi Torii, Tokyo (JP); Yuji Kaneko, Tokyo (JP)

(73) Assignee: NEC Corporation, Tokyo (JP)

( * ) Notice: Subject to any disclaimer, the term of this patent is extended or adjusted under 35 U.S.C. 154(b) by 220 days.

(21) Appl. No.: 12/443,403

(22) PCT Filed: Oct. 2, 2007

(86) PCT No.: PCT/JP2007/069272
§ 371 (c)(1),
(2), (4) Date: Mar. 27, 2009

(87) PCT Pub. No.: WO2008/044542
PCT Pub. Date: Apr. 17, 2008

(65) Prior Publication Data
US 2010/0088318 A1 Apr. 8, 2010

(30) Foreign Application Priority Data
Oct. 6, 2006 (JP) ................. 2006-275169

(51) Int. Cl.
*G06F 17/00* (2006.01)
*G06F 17/30* (2006.01)

(52) U.S. Cl. ........ 707/673; 707/662; 707/696; 707/702; 707/711; 707/741

(58) Field of Classification Search .................. 707/639, 707/645, 696, 741, 936, 640, 656–648, 662, 707/673, 702, 711; 711/161–162
See application file for complete search history.

(56) References Cited

U.S. PATENT DOCUMENTS

| 6,175,835 B1 * | 1/2001 | Shadmon ................. 707/696 |
| 6,571,250 B1 * | 5/2003 | Hara ....................... 1/1 |
| 6,920,460 B1 * | 7/2005 | Srinivasan et al. ........... 1/1 |
| 7,254,580 B1 * | 8/2007 | Gharachorloo et al. ......... 1/1 |

(Continued)

FOREIGN PATENT DOCUMENTS
EP 0774715 * 5/1997
(Continued)

OTHER PUBLICATIONS

Shivakumar, Narayanan; Hector Garcia-Molina, Wave-Indices: Indexing Evolving Databases, Jun. 1997, ACM, SIGMOD 1997, vol. 26, No. 2, p. 381-92.*

(Continued)

*Primary Examiner* — Srirama Channavajjala
(74) *Attorney, Agent, or Firm* — Michael Dryja

(57) ABSTRACT

Disclosed is a system in which an index registration unit registers an index, which will be used for search processing, as a partitioned index which is partitioned on a time series basis, and a search means reads indexes older than a specified point in time, which is used as a search base point, to perform search processing, thereby searching for information based on a point in time in the past.

27 Claims, 12 Drawing Sheets

U.S. PATENT DOCUMENTS

| | | | |
|---|---|---|---|
| 7,293,016 B1* | 11/2007 | Shakib et al. | 1/1 |
| 7,761,456 B1* | 7/2010 | Cram et al. | 707/754 |
| 2003/0101183 A1* | 5/2003 | Kabra et al. | 707/8 |
| 2005/0071390 A1* | 3/2005 | Midgley et al. | 707/204 |
| 2005/0198076 A1* | 9/2005 | Stata et al. | 707/200 |
| 2006/0106792 A1* | 5/2006 | Patterson | 707/5 |
| 2007/0043705 A1* | 2/2007 | Kaushik et al. | 707/3 |
| 2007/0050333 A1* | 3/2007 | Vogler | 707/3 |
| 2007/0208755 A1* | 9/2007 | Bhatkar et al. | 707/10 |
| 2007/0294321 A1* | 12/2007 | Midgley et al. | 707/204 |
| 2008/0091744 A1* | 4/2008 | Shitomi et al. | 707/204 |
| 2008/0228795 A1* | 9/2008 | Lomet | 707/101 |
| 2010/0131479 A1* | 5/2010 | Kamimura | 707/696 |

FOREIGN PATENT DOCUMENTS

| | | | |
|---|---|---|---|
| JP | 1995146880 A | | 6/1995 |
| JP | 1997223152 A | | 8/1997 |
| JP | 2000259646 A | | 9/2000 |
| JP | 2004178070 A | | 6/2004 |
| WO | WO 99/27552 | * | 7/1997 |
| WO | WO 99/14692 | * | 3/1999 |

OTHER PUBLICATIONS

Elmasri, R.; Jaseemuddin, M.; Kouramajian, V.; , "Partitioning of time index for optical disks," Data Engineering, 1992. Proceedings. Eighth International Conference on , vol., no., pp. 574-583, Feb. 2-3, 1992.*

Narayanan Shivakumar and Hector Garcia-Molina. Wave-indices: indexing evolving databases. In Proceedings of the 1997 ACM SIGMOD international conference on Management of data (SIGMOD '97), ACM, New York, NY, USA, 381-392; 1997.*

Verma, Rakesh M. and Peter J. Varman, Efficient Archivable Time Index: A Dynamic Indexing Scheme for Temporal Data, 1994, In Proceedings of the International Conference on Computer Systems and Education, pp. 59-72.*

Nørvåg, Kjetil, Supporting temporal text-containment queries in temporal document databases,Apr. 2004, Data & Knowledge Engineering, vol. 49 Issue 1, pp. 105-125.*

Narayanan Shivakumar and Hector Garcia-Molina. Wave-indices: indexing evolving databases. In Proceedings of the 1997 ACM SIGMOD international conference on Management of data (SIGMOD '97), ACM, New York, NY, USA, 381-382; 1997.*

M. Y. Eltabakh et al. "Duplicate Elimination in Space-partitioning Tree Indexes", 19th International Conference on Scientific and Statistical Database Management (SSDBM 2007), 10 pages.*

International Search Report for PCT/JP2007/069272 mailed Nov. 20, 2007.

K. Kita et al., "Information Search Algorithm", Kyoritsu Shuppan Co., Ltd, Jan. 1, 2002, p. 6, p. 160-179.

Japanese Office Action for JP2008-538663 mailed May 29, 2012.

* cited by examiner

INFORMATION DOCUMENT SEARCH SYSTEM, METHOD AND PROGRAM FOR PARTITIONED INDEXES ON A TIME SERIES IN ASSOCIATION WITH A BACKUP DOCUMENT STORAGE

CROSS-REFERENCE TO RELATED APPLICATIONS

The present invention is the National Phase of PCT/JP2007/069272, filed Oct. 2, 2007, which is based upon and claims priority from Japanese patent application 2006-275169 (filed on Oct. 6, 2006) the content of which is hereby incorporated in its entirety by reference into this application.

TECHNICAL FIELD

The present invention relates to a an information search system, an information search method, and an information search program, and more particularly to an information search system, an information search method, and an information search program that enables search based on a past view point.

BACKGROUND ART

Widespread use of a web search system, such as Google (registered trademark), has made commonplace a full text search system for electronic files. With a search system, the user searches for information on a daily basis.

Today, the major trend in the full text search systems for electronic files is that an index for high-speed search is created in advance and a user searches an electronic file using this index. Examples of such information search systems are described in Patent Document 1 and Non-Patent Document 1.

The N-gram based method and the morphological analysis method are known as a technology for creating an index (Non-Patent Document 1).

An index created by those methods, which is generally uncompressed, requires a large capacity that is about 200-300% of the capacity of the original documents.

Another problem is that it is difficult to update this index dynamically.

A user searches for information using this index. This means that the user can get the search result of search target data existing at the time the index was created or updated.

For example, if the index is created based on one-day-old search target data, additions or updates that are made after the index creation time for the search target data are not reflected on the search result.

So, there is a need for reflecting search target data on an index as real-time as possible. The technologies for satisfying this need are described in Patent Document 1 and Patent Document 2.

Patent Document 1 discloses a document search device that, with the index of newly registered document files created in a memory, the document search unit uses both the index data on the new document data stored in the memory and the index data on existing document files stored in the disk device to search the document files. Patent Document 2 discloses a document search device that registers index data on new documents in a sub-index smaller than the main index when the new documents are registered in the index and, at a search time, accesses both indexes to combine the results into the search result.

Patent Document 1: Japanese Patent Kokai Publication No. JP-A-9-223152 (page 1)
Patent Document 2: Japanese Patent Kokai Publication No. JP-A-7-146880
Non-Patent Document 1: Kita Kenji, Tsuda Kazuhiko, Shishibori Masamiki "Information Search Algorithm", KYORITSU SHUPPAN CO., LTD, Jan. 1, 2002, pp. 6, pp. 160-179

SUMMARY

The disclosures of Patent Documents and Non-Patent Document described above are hereby incorporated by reference into this specification. The following describes the analysis of the technologies related to the present invention. The conventional and existing information search systems have the problems described below.

That is, even if a user performs the same operation as that for a search query that was made in the past, the user cannot sometimes reach the information in the same way as the user did in the past.

The reason is that, in a system where information sources of search target are increased or updated daily, an addition or an update is made daily also to search index and, so, even if the user performs the same search query, the search system sometimes returns different search results.

A user may store a path or a URI (Uniform Resource Identifier) of a file, in order to reach the file or information source on the web discovered by the user in the past.

In general, however, the user does not store a path or a URI of a file; instead, the user sometimes memorizes only how to reach the information.

More specifically, in a situation where a search engine is widely used as it is today, the user memorizes only a search query that was input to the search engine and uses that query again for the search.

For example, the user memorizes a query "a web page searched for using the keyword zzzz, three days ago".

However, because the index of the search engine is updated or increased daily, the user may obtain different search results even if the same keyword is used for the search. This sometimes results in a situation in which the user cannot reach a file or information again that could be reached before.

There is a possible need for the user to obtain the same search result as that in the past.

Therefore, the present invention is newly provided in view of the foregoing, and a major object of the present invention is to provide an information search system, method, and program that enable search based on a past base point.

MEANS TO SOLVE THE PROBLEMS

The present invention, which seeks to solve one or more of the problems described above, is summarized as follows According to the present invention, there is provided an information search system, in which partitioned indexes, which are partitioned on a time series basis, are prepared in index storage means as indexes for information search, the system comprising search means that selects a corresponding partitioned index from a plurality of partitioned indexes, which are partitioned on a time series basis, based on a condition specified by a search request and performs a search using the selected partitioned index.

According to the present invention, there is provided an information search system comprising:

index registration means that registers a partitioned index, which is partitioned on a time series basis, in index storage means as an index for document search; and search condition input means that receives, as a search condition, information on a time or a trigger, which is used as information on a search base point; and search means that selectively reads a past partitioned index from the index storage means, based on the information on a search base point that is received, and performs search processing.

In the present invention, if information on the search base point time is not specified, the search means performs the search processing using a latest index and all past partitioned indexes registered in the index storage means.

In the present invention, the configuration may further comprise partitioning trigger notification means that notifies the index registration means of a trigger for index partitioning and registration.

In the present invention, the configuration may further comprise means that notifies the index registration means of a trigger for index partitioning when a backup copy of search target documents is created.

In the present invention, when index data on the same document are stored in a plurality of indexes, the search means performs processing with priority given to a later index.

In the present invention, the index registration means reads a document, which is to be registered in an index, from document storage means in which documents are stored, performs predetermined preparatory processing necessary for index registration, and registers index data in a latest index, and, when performing index partitioning, judges whether or not a trigger for index partitioning is satisfied and, if the index partitioning trigger is satisfied, sets index data, which is stored in a current latest index, in one of partitioned indexes and then creates a latest index as a null and sets the null latest index as an index registration target of the index registration means.

In the present invention, the partitioned indexes recorded in the index storage means include predetermined attribute information used in an information search at a point in time in the past, and an information search result based on the attribute information at the point in time in the past is output by selecting and searching a partitioned index corresponding to the point in time in the past.

According to the present invention, there is provided a method comprising the steps of:

preparing partitioned indexes, which are partitioned on a time series basis, in advance as indexes for information search; and selecting a corresponding partitioned index from a plurality of partitioned indexes, which are partitioned on a time series basis, based on a condition specified by a search request, for performing a search using the selected partitioned index.

The method according to the present invention further comprises:

an index registration step of registering a partitioned index which is partitioned on a time series basis, in index storage means as an index for document search;

a step of receiving, as a search condition, information on a time or a trigger, which is used as information on a search base point; and a step of performing search processing by selectively reading past partitioned indexes from the index storage means, based on the information on a search base point that is received.

In the method according to the present invention, if no information on the search base point time is specified, all indexes registered in the index storage means are used for the search.

The method according to the present invention further comprises a step of notifying the index registration step of a trigger for index partitioning.

The method according to the present invention further comprises a step of notifying the index registration step of a trigger for index partitioning, when a backup copy of search target documents is created.

A computer program according to the present invention causes a computer to execute the processing comprising:

registering a partitioned index which is partitioned on a time series basis, in index storage means as an index for document search;

receiving information on a time or a trigger, which is used as information on a search base point, as a search condition; and selecting a past partitioned index from the index storage means, based on the information on a search base point that is received and performing search processing.

The present invention enables the user to search for information based on a past base point.

The reason is that the system according to the present invention records the indexes by partitioning them on a time series basis to allow the user to perform search processing using only the indexes older than a past base point.

Still other features and advantages of the present invention will become readily apparent to those skilled in this art from the following detailed description in conjunction with the accompanying drawings wherein only exemplary embodiments of the invention are shown and described, simply by way of illustration of the best mode contemplated of carrying out this invention. As will be realized, the invention is capable of other and different embodiments, and its several details are capable of modifications in various obvious respects, all without departing from the invention. Accordingly, the drawing and description are to be regarded as illustrative in nature, and not as restrictive.

PREFERRED MODES

Next, the best mode for carrying out the present invention will be described in detail with reference to the drawings.

Figure 1:
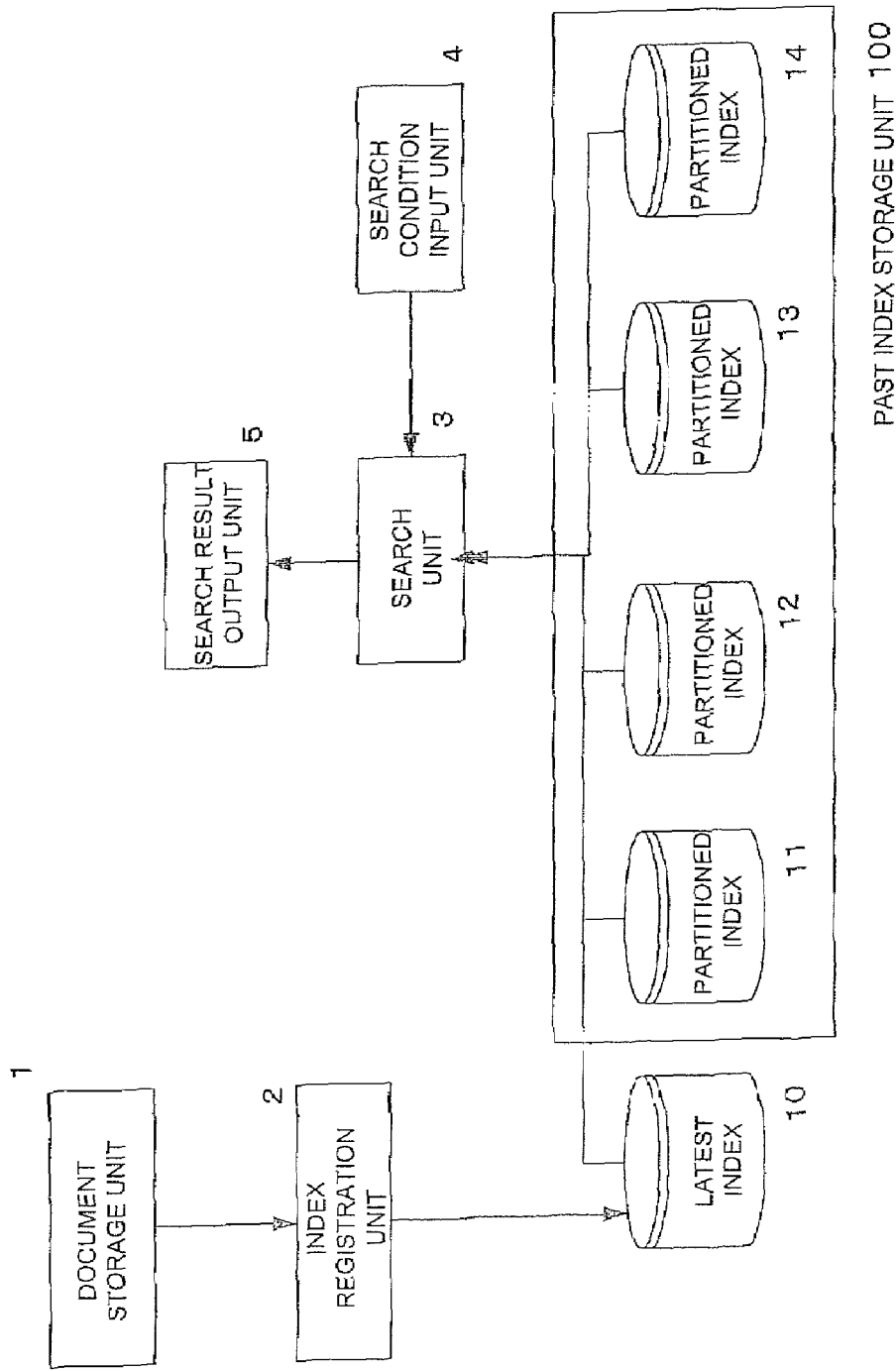
FIG. 1 is a block diagram showing the configuration of a first exemplary embodiment of the present invention.

FIG. 1 is a diagram showing the configuration of a first exemplary embodiment of the present invention. Referring to FIG. 1, the exemplary embodiment comprises a document storage unit 1, an index registration unit 2, a search unit 3, a search condition input unit 4, a search result output unit 5, and a past index storage unit 100.

The past index storage unit 100 includes partitioned indexes 11-14. Although there are four partitioned indexes 11-14 in FIG. 1, there is no limit to the number of partitioned indexes.

The general operation of those units is as follows.

The document storage unit 1 performs the function to hold search target documents. For example, the document storage unit 1 is one of the following:

Hard disk drive of user's personal computer;
External device such as NAS (Network Attached Storage);
WWW (World Wide Web);
Intranet (web pages in a company).

The search target documents refer to structured information stored in electronic files or databases, for example, web pages or office documents stored in the storage unit such as those described above.

The index registration unit 2 has the function to create the index of a search target document stored in the document storage unit 1 and to register the created index in a latest index 10.

The search unit 3 uses the indexes in the partitioned indexes 10-14 to perform the search processing. Search conditions such as a search keyword or a search time (what time of documents does the user want to search) are received from the search condition input unit 4. The result of the search processing is passed to the search result output unit 5.

The search condition input unit 4 allows the user to specify search conditions such as:

Search keyword used in the search; and
Information on search base point,
and passes those conditions to the search unit 3. The information on a search base point may include time information such as year/month/day or hour/minute or may include time trigger information such as a time related event.

As an example of the search condition input unit 4, an entry box of a search keyword entered by a user from a web browser, may be utilized.

The search result output unit 5 performs the function to receive the result of search processing performed by the search unit 3 and to output the search result to the user as the search result. As an example of the search result output unit 5, a software that outputs a list of search results on a user's web browser may be utilized.

The function and the processing of the index registration unit 2, search unit 3, search condition input unit 4, and search result output unit 5 may be implemented by control of programs executed on a computer.

The latest index 10 and the partitioned indexes 11-14 included in the past index storage unit 100 are indexes used for the search processing. The partitioning of these indexes is performed according to a partitioning trigger on a time series basis.

The latest index 10 is a partitioned index which includes the latest update.

The index registration unit 2 executes indexing for a new document and an updated document and registers the index in the latest index 10.

Although the past partitioned indexes are configured by a total of four partitioned indexes in FIG. 1, the number of partitioned indexes is not limited but is increased as the indexes are further partitioned on a time series basis.

The latest index 10 and the partitioned indexes 11-14 are saved in storage devices such as a memory or magnetic disk devices.

Those indexes are saved as

Ordinary file format; or
Records in a database.

The latest index 10 and the partitioned indexes 11-14 may be saved in different storage devices, one for each, or in the same storage device.

Figure 2:
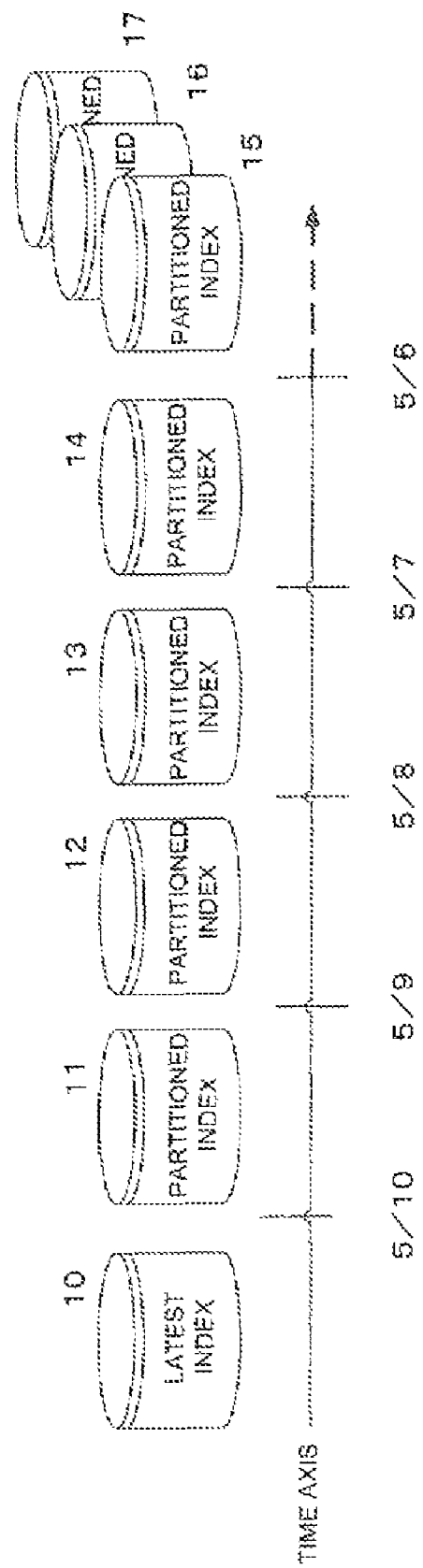
FIG. 2 is a diagram showing an example of index management in the first exemplary embodiment of the present invention.

FIG. 2 is a schematic diagram showing one exemplary embodiment of index management. In the example in FIG. 2, it is assumed that the indexes are partitioned on a time-series basis and the indexes are partitioned once a day. The current date in the example in FIG. 2 is "5/11" and the index registration of a document on the current date is performed in the latest index 10.

Relating the partitioned indexes, the index registered one day before, "5/10", is held in the partitioned index 11 that is neighbor on the right; and the index registered two days before, "5/9", should be held in the partitioned index 12.

In this way, the latest index in the past is held intact sequentially as one of partitioned indexes.

Therefore, the number of past indexes is increased over time.

When a predefined partitioning trigger occurs, the latest index (an object in which the index registration unit 2 registers an index) is created newly.

The index (latest index 10) that has been the latest index becomes the second latest index that is one of the partitioned indexes.

This structure may also be implemented by changing the registration path to the registration target used by the index registration unit 2.

The structure may also be implemented by copying the data in the latest index 10 to the past index storage unit 100, by creating a new partitioned index, and by clearing the latest index 10.

The latest index 10 and the partitioned indexes 11-17 may be stored anywhere physically or logically.

Next, the operation of the search processing in this exemplary embodiment will be described in detail with reference to the flowchart in FIG. 3.

Figure 3:
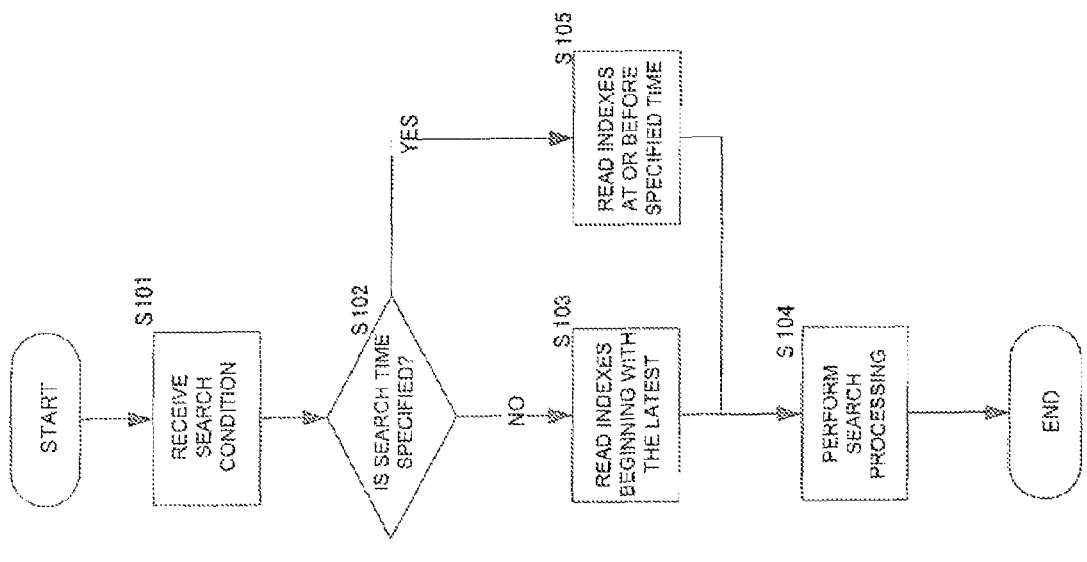
FIG. 3 is a flowchart showing the search processing operation in the first exemplary embodiment of the present invention.

First, a user enters a search condition via the search condition input unit 4 (step S101 in FIG. 3).

The following are entered as the search condition.

Ordinary search query information (search keyword, etc.); and

Date/time information used as the base point of the search processing (termed "base point information") if necessary.

This base point information is information necessary when the search processing is performed based on a past view point.

The search processing based on a past view point refers to a search performed based on the information, for example, three days ago when the user wants to get exactly the same result as that of the search processing performed three days ago.

Next, the search unit 3 checks if the base point information is entered (step S102).

If the base point information is not entered (No in step S102), the search unit 3 performs the search by reading all indexes (step S103).

The processing in step S103 will be described with reference to the example shown in FIG. 4.

Assume that there are partitioned indexes 11-17. In this case, the search unit 3 performs the search processing by reading all indexes, from the latest index 10 to the partitioned index 17.

Figure 4:
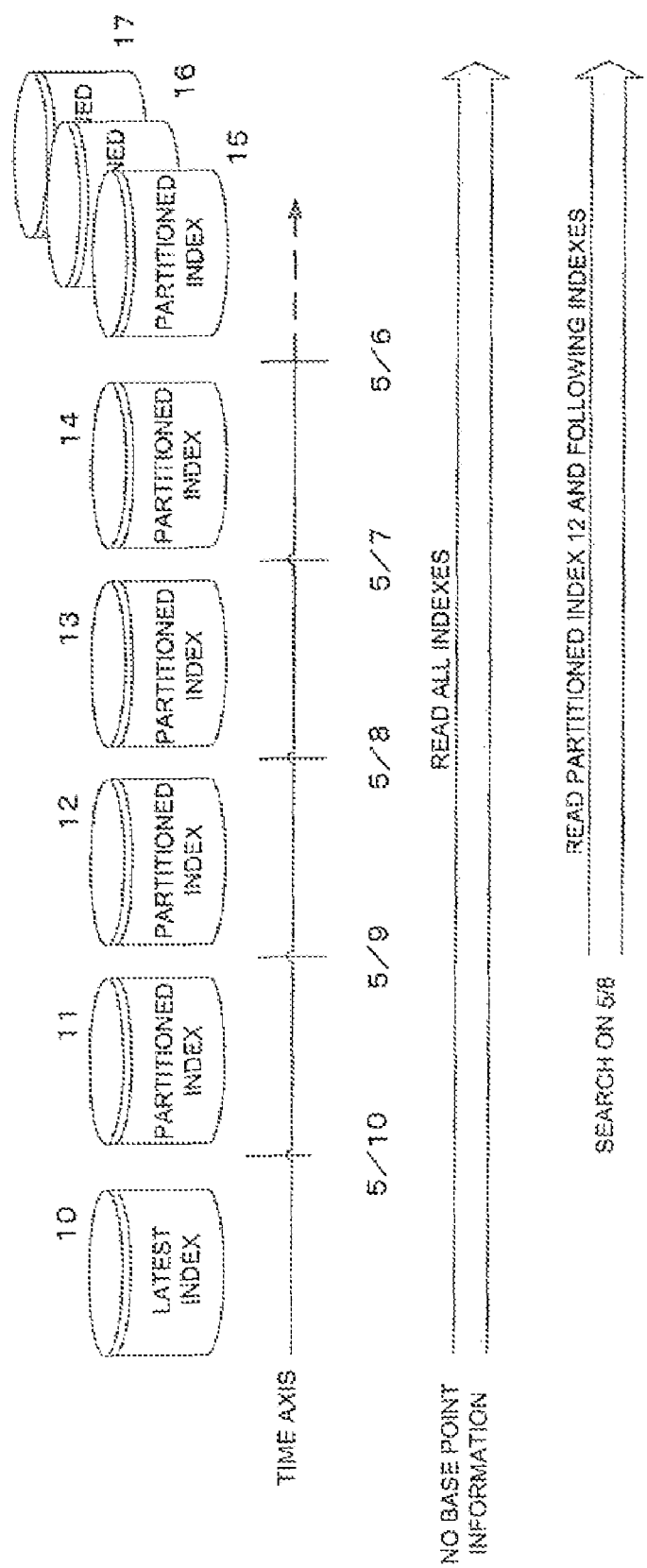
FIG. 4 is a diagram showing the index reading processing of the search processing operation in the first exemplary embodiment of the present invention.

Note that, if the same document is updated, the index data on that document is stored in plural indexes; in this case, priority is given always to a newer index (in FIG. 4, priority is given to an index on the left side).

In step S103, the search unit 3 performs the search processing based on the index information that is read (step S104). The search unit 3 notifies the search result output unit 5 about the search result.

If control is passed to Yes in step S102 (if base point information is entered), the search unit 3 performs the search by reading the indexes at or before the time specified by the base point information (step S105).

The operation in step S105 will be described with reference to the example in FIG. 4.

Assume in this example that the base point information "5/8" is entered. In this case, because the search processing is performed based on the index corresponding to "5/8", the search unit 3 reads the indexes beginning with the partitioned index 12 corresponding to "5/8".

That is, the search unit 3 does not read the latest index 10 in which the latest update (information on or after "5/10") is registered and the partitioned index 11 in which the information on "5/9" is registered, but reads all other indexes and performs the search processing.

Note that, when the same document is updated, the index on that document is stored in plural indexes; in this case, priority is given always to a newer index in the same way as in step S103 (in FIG. 4, priority is given to an index on the left side).

The search processing performed in this way allows the user to search for desired data based on the index data at the time specified by the base point information.

As a modification of the exemplary embodiment of the present invention, it is also possible not to read all past partitioned indexes in the search processing in step S105 or S103.

For example, the indexes, from the latest index 10 to the partitioned index 14, are read, but the older partitioned indexes are not.

By doing so, the indexes from the latest index to the index, in which the update on "5/6" are stored, are used for the search, but the updated changes before that date are not.

How far in the past the partitioned indexes should be read is a tradeoff with the search performance.

How far in the past the partitioned indexes should be read may be decided, for example, by the following methods.

(A) Information on "Over how many days in the past should changed-files be searched" is entered from the search condition input unit 4.

(B) The limit on the size of the indexes to be read by the search unit 3 is decided in advance to prevent more partitioned indexes from being read.

One of the possible modes for the method in (B) is to decide the limit according to the cache memory size of the server that performs the search processing.

This modification, if used, could increase the search processing performance.

The reason is that one of the factors that determine the search processing performance is the capacity of the indexes that must be read.

Next, the preparations for the search processing in the first exemplary embodiment of the present invention will now be described.

To perform the search processing in this exemplary embodiment, the following two processing steps are required.

Indexing for the search target documents; and

Partitioning of the indexes.

Those processing operations will be described below.

First, the operation of index registration processing for the search target documents will be described with reference to the flowchart in FIG. 5.

Figure 5:
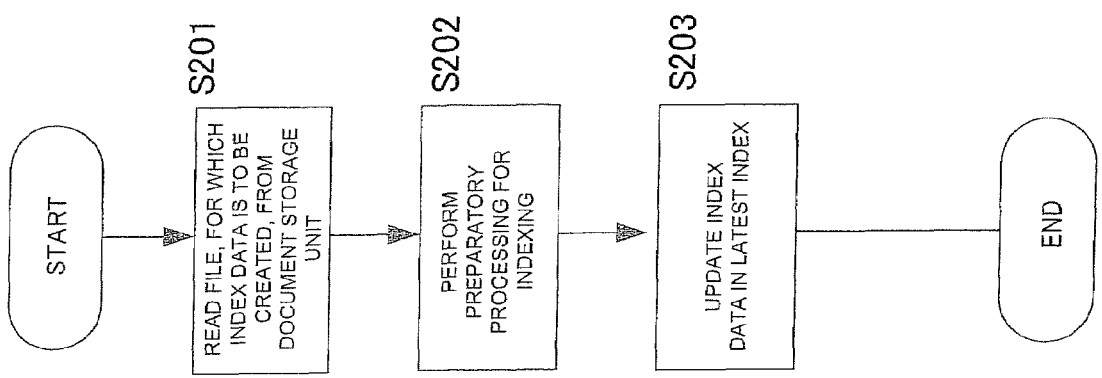
FIG. 5 is a flowchart showing the processing of adding data to an index in the first exemplary embodiment of the present invention.

The index registration unit 2 reads a document (search target document), which will be registered in the index, from the document storage unit 1 (step S201 in FIG. 5).

Next, the index registration unit 2 performs the preparatory processing for registering the document in the index (step S202).

For example, in the inverted file method that is one of indexing methods, this preparatory processing includes the following processing.

Read a search target document, extract text, and extract index words, which will be registered in the index, from the text.

Recognize the position of the index words and the number of occurrences.

The detail of the indexing method is described in the document cited as Non-Patent Document 1 and, so, the description is omitted here.

Finally, the index registration unit 2 registers the information, which is produced by the preparatory processing for registering in the index, in the latest index 10 (step S203).

If the latest index 10 does not include information on the search target document, the index registration unit 2 adds the information to the index.

If the latest index 10 includes information on the search target document, the index registration unit 2 updates the index.

During ordinary search index creation, the index registration unit 2 performs the index update processing including creation, updating, and deletion.

The creation and the update are performed as described above. For the deletion, the index registration unit 2 performs the processing in which the index data on a deleted document is registered as a null in the latest index 10 without deleting the past partitioned index 11 and subsequent indexes.

Next, the operation of the index partitioning processing will be described with reference to the flowchart of FIG. 6.

This index partitioning processing may be performed by the index registration unit 2 or by separately providing means for managing the index.

Figure 6:
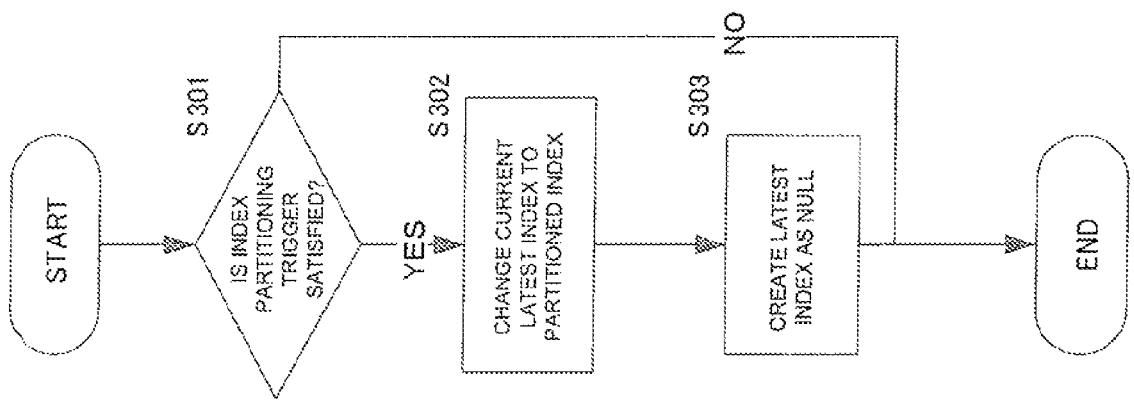
FIG. 6 is a flowchart showing the operation of the first exemplary embodiment of the present invention.

First, It is checked whether or not the index partitioning trigger is satisfied (step S301 in FIG. 6).

For example, the index partitioning trigger is as follows.

The time or the day of week is predetermined for regular index partitioning, and An index is partitioned according to the size of the index.

When the index partitioning trigger is not satisfied, the index partitioning processing need not be performed and so no processing is performed in this processing flow.

When the index partitioning trigger is satisfied, the index that is the latest index 10 at the present moment is changed to one of the partitioned indexes (step S302).

This is accomplished in one of the following methods. For example,

Copy the latest index 10 to the past index storage unit 100 physically or logically.

Rename the latest index 10 so that it becomes a partitioned index.

Change the index of the registration target in which the index registration unit 2 registers index data.

Finally, a new latest index 10 is created as a null (step S303).

From this time on, this latest index 10 is used as the index registration target of the index registration unit 2.

Although the index partitioning processing may be performed according to the flowchart in FIG. 6, the partitioning processing may also be event-driven by a notification from some other means.

For example, in an installation where the index is partitioned at 0:00 every day, means is prepared separately for sending a notification requesting that the index partitioning processing be performed at 0:00 everyday and the notification is sent to the means responsible for performing the partitioning processing. The yesterday's latest index, which was used before 0:00, becomes the latest past partitioned index, and an index for one day is created and, from this time on, this new latest index 10 is used as the registration target of the index registration unit 2.

A second exemplary embodiment of the present invention that will be described later is an example based on this structure.

Note that the index partitioning processing need not always be performed by the index registration unit 2 but that some other means may also be prepared separately for performing index partitioning only. The user may select a method best suited for the installation.

The following describes the effect of the first exemplary embodiment of the present invention.

To perform the search processing included on a point of time in the past, it is necessary to hold all indexes in the past. In contrast, the indexes are held in the first exemplary embodiment by partitioning them on a time series basis to allow the indexes, which will be read, to be switched according to the entered base point information. So, the capacity of past indexes that must be held can be reduced.

By storing the past search results, the same effect can also be achieved by holding only the latest index. However, in this method, the search results based on a past view point can be returned only to the searches that were actually performed.

In contrast, in this exemplary embodiment, the search operation based on a past view point can be performed even if a search query was not made in the past.

In addition, the latest index 10, in which only the latest registered index data is stored, requires less capacity. That is, the latest index 10 stores only the latest registered index data as the difference. Similarly, with one past partitioned index used as the base, only the difference information is accumulated in a partitioned index that follows. This structure makes it possible to store the indexes in a high-speed storage device (semiconductor memory, etc.), thus increasing the speed of the index addition/update processing.

A (second) modification of the first exemplary embodiment of the present invention. In the second modification of the first exemplary embodiment of the present invention, the search result is analyzed on a time series basis.

The application of the first exemplary embodiment of the present invention gives the following functions.

Figure 7:
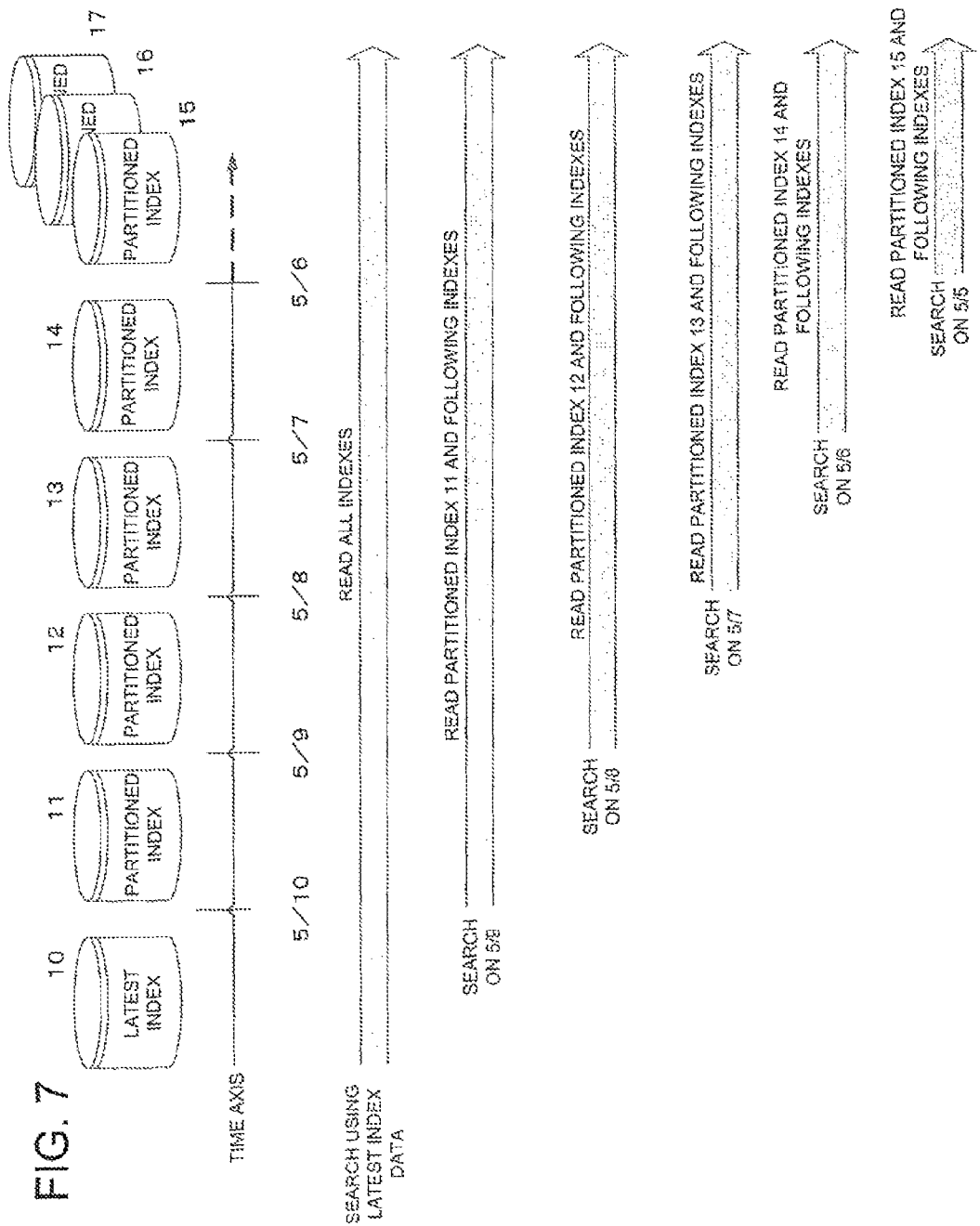
FIG. 7 is a diagram showing the time series analysis function provided as a modification of the first exemplary embodiment of the present invention.

To display a change in the search results of a search query on a time series basis; and To display a change in the search ranking of a search query about the same document The example in FIG. 7 indicates that the search processing, in which the group of indexes used for the search processing is switched, produces the search results, one for each date.

The functions given above can be achieved by collecting the search results.

Although the partitioned indexes are partitioned in this exemplary embodiment according to the date or the like, for example, the date of index registration, on a time series basis, another configuration is also possible in which the partitioned indexes are partitioned based on the document attributes (for example, timestamp) referenced during index creation.

Figure 8:
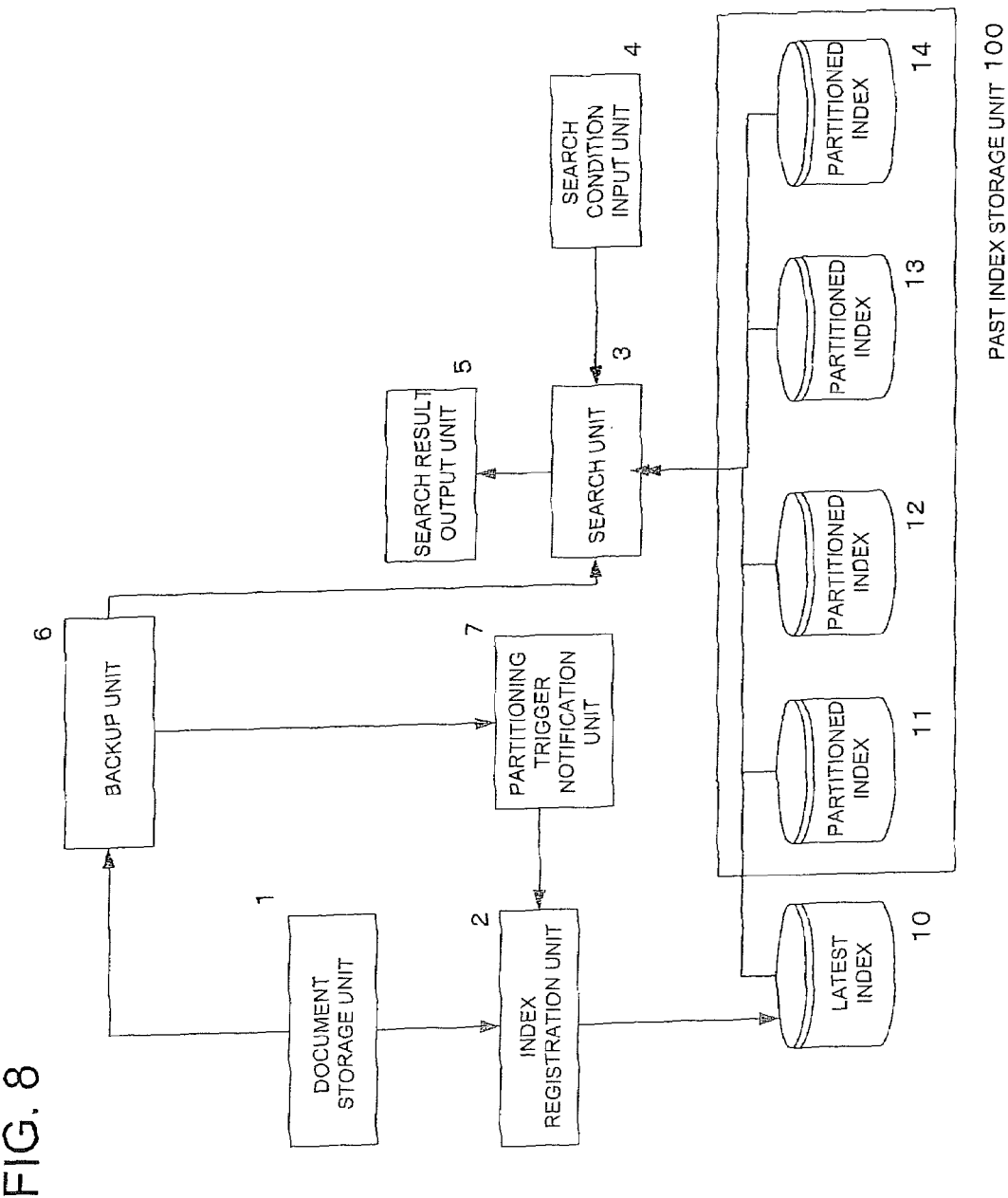
FIG. 8 is a block diagram showing the configuration of a second exemplary embodiment of the present invention.

Next, a second exemplary embodiment of the present invention will be described in detail below with reference to the drawings. Referring to FIG. 8, the second exemplary embodiment of the present invention comprises the components of the first exemplary embodiment shown in FIG. 1 and further comprises a backup unit 6 and a partitioning trigger notification unit 7.

Except those two units, the components are the same as those in the first exemplary embodiment and so the description is omitted here. The following describes the general operation of the backup unit 6 and the partitioning trigger notification unit 7.

The backup unit 6 creates and stores a backup of data (a spare copy of data) stored in the document storage unit 1.

The backup unit 6 is used to restore data, stored in the document storage unit 1, to data at a particular point in time. An actual example is to regularly save a copy of whole data or updates in the storage device.

The function such as the one called a "snapshot" is considered one of the backup unit 6 wherein the pointer information indicating the positions of data on a disk is recorded, instead of having a copy of actual data, to restore data stored in the document storage unit 1 to a particular point in time.

In addition, one of the following data protection methods for accessing past data may be used as the backup unit 6.

CDP (Continuous Data Protection) control software;

Database software; and

Journaling software

CDP is a data protection technique that, each time data is updated, saves the changed content on a basis of time series. This software tracks and captures data write on the storage and, when data is updated, stores the content of the update in secondary storage (change history database) as a journal.

This software allows the user to reproduce data in any point of the past (Any Point In Time (APIT) Recovery), avoiding data loss.

This function is equivalent to continuing an additional backup on a second basis.

A snapshot allows data to be restored only on the order of scores of minutes, while CDP allows data recovery points to be set on the level of seconds.

Because the whole actual data cannot be restored only from the data update history records, the whole volume is replicated at the start and the history of updates to this replication is recorded on a time series basis.

Available CDP types are as follows.

Block type;

File type; and

Application type;

In the block type, data changes are tracked on a block basis at the physical disk level or the logical volume level.

In the file type, data changes are tracked at a file level.

In the application type, the behavior of a particular application is recognized by the log information or via API to track data changes for each file update or for each event occurrence.

The tracking frequency is at least in units of seconds for the block unit, or at least once every file event update for the file type and the application type.

Changed contents are written in the secondary storage either synchronously or asynchronously.

"TimData™" (trademark) from TimeSpring is commercially available as the CDP software.

The partitioning trigger notification unit 7 notifies the index registration unit 2 of a part or all of the backup creation trigger time for which the backup unit 6 holds a copy (or restorable point) of data copied from the document storage unit 1.

The index registration unit 2 partitions the index according to the notified partitioning trigger time.

More specifically, when the backup unit 6 creates a backup once a day at 0:00, the partitioning trigger notification unit 7 instructs the index registration unit 2 to partition the index at 0:00 everyday.

Figure 9:
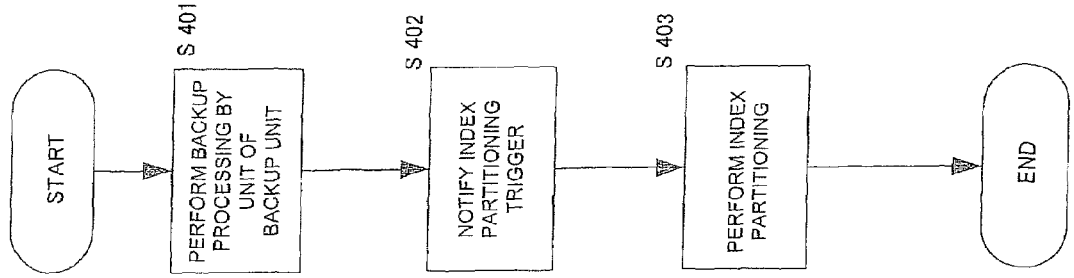
FIG. 9 is a flowchart showing the flow of the index partitioning operation that works with backup means in the second exemplary embodiment of the present invention.

The following describes, with reference to FIG. 9, how the index registration unit 2 works with the backup system to partition the index in the second exemplary embodiment of the present invention.

First, the backup unit 6 acquires a backup of data held in the document storage unit 1 (step S401 in FIG. 9).

In the specific exemplary embodiment, data at a backup time is read from the storage device of the document storage unit 1 and is stored in the storage device of the backup unit.

Next, the partitioning trigger notification unit 7 notifies a trigger, with which the backup unit 6 obtains the backup, to the index registration unit 2 (unit that performs the index partitioning processing) (step S402).

Finally, the index registration unit 2 performs the index partitioning processing (step S403).

The index partitioning processing is performed in the same way as in the first exemplary embodiment described above.

The system in the second exemplary embodiment of the present invention allows the user not only to search for data based on a past base point in the same way as in the first exemplary embodiment described above but also to search the backup data.

Figure 10:
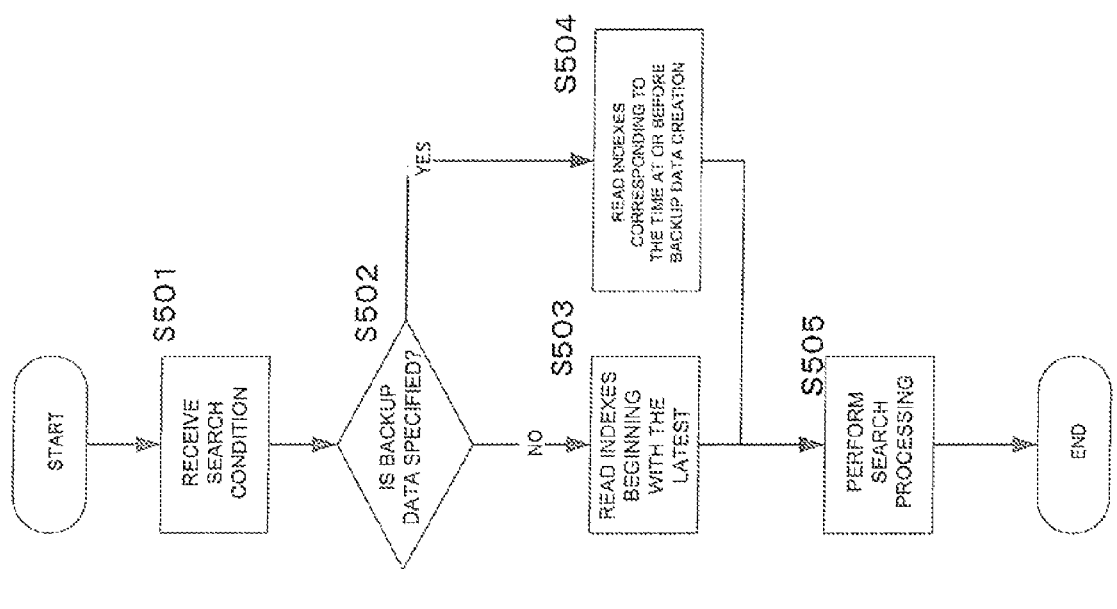
FIG. 10 is a flowchart showing the search processing operation in the second exemplary embodiment of the present invention.

The following describes the search processing operation in this exemplary embodiment with reference to the flowchart in FIG. 10.

First, the user enters a search condition via the search condition input unit 4 (step S501 in FIG. 10).

As the search condition, the user specifies or selects the following.

Ordinary search query information (search keyword, etc.); and

Type of backup data to be searched (or backup creation time) if necessary

In case the backup operation is started at 0:00 everyday, the year/month/day information may be entered as the time information specified for the search condition.

In case the backup is created several times per month or week, backup event information (for example, before and after what number of times of backup in which month) may be specified as the past information. A range of time or a logical expression may also be specified as the search base point condition.

The search unit 3, which performs the search processing, first checks if a backup data type is specified (step S502).

If backup data is not selected (No), the search unit 3 reads all indexes and performs the search processing (step S503).

This processing is performed in the same way as in the first exemplary embodiment and so the description is omitted here.

The search unit 3 completes the search processing based on the index information read in step S503 (step S505).

The search unit 3 notifies the search result output unit 5 of the search result.

If step S502 is Yes (backup data is specified), the search unit 3 reads the index corresponding to the time at or before the time the specified backup data was created and performs the search processing (step S504).

The operation in step S504 will now be described with reference to the example in FIG. 11.

Figure 11:
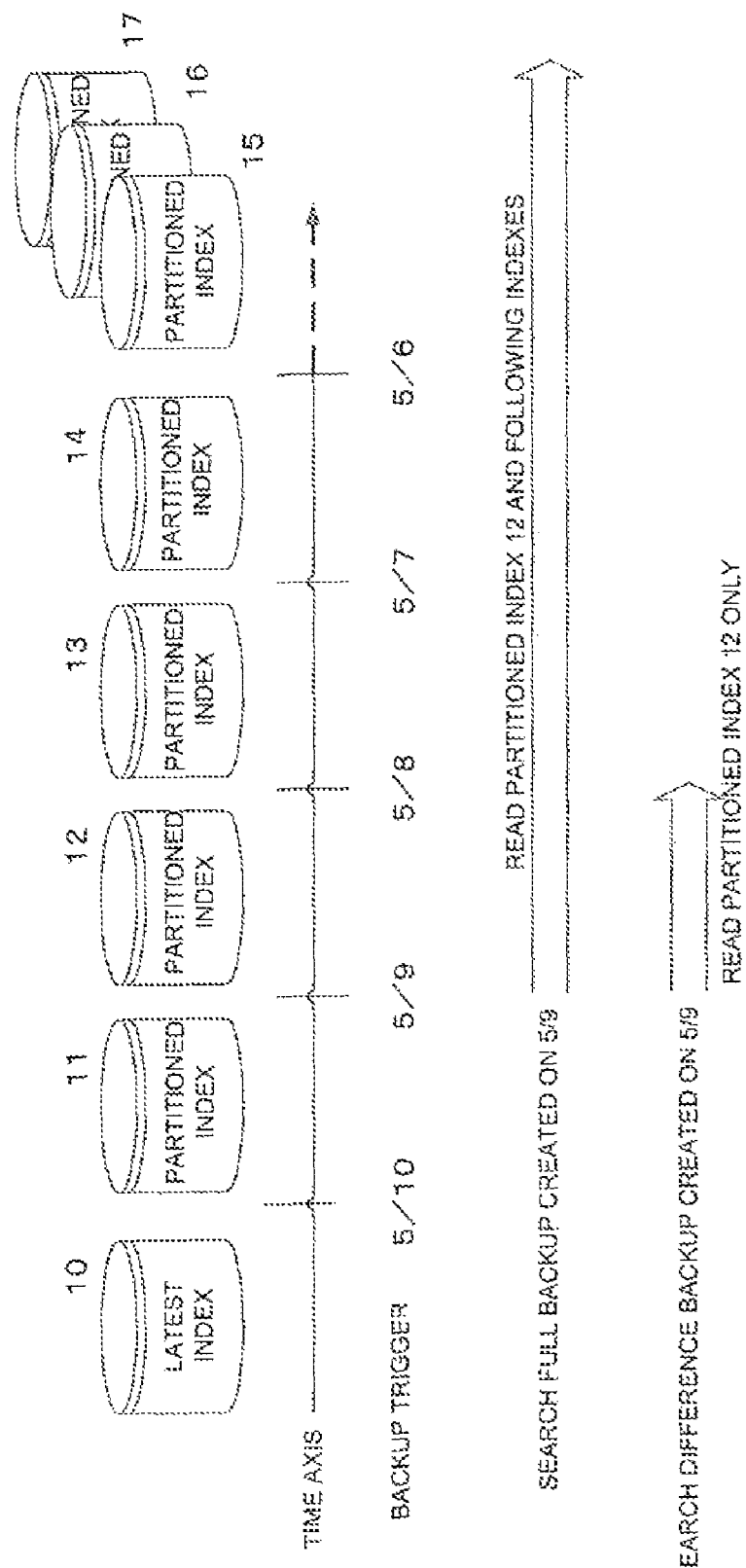
FIG. 11 is a diagram showing the index read processing during the search processing in the second present invention of the present invention.

FIG. 11 is a diagram showing how the index is partitioned. Assume that the backup is created, once a day, in the system and the index is partitioned at the backup creation trigger time.

In this case, the update that is made from the time the backup is created on "5/9" to the time the backup is created on "5/10" is reflected in the partitioned index 11.

Now, assume that the search processing is performed for the backup data created on 5/9. In this case, the search unit 3 reads the partitioned index 12 and the older partitioned indexes to perform the search processing.

Although a system is assumed in the example above in which a full backup is created, the search processing may also be performed similarly for the difference backup data created on 5/9.

For example, in the example in FIG. 11, the search unit 3 reads only the partitioned index 12 and performs the search processing.

Note that, when the search unit 3 performs the search processing (step S504) or when the search result output unit 5 outputs the result (step S505), the path to the file (URI, file name, etc.) of the search result must be rewritten.

This is because the path to a search target document, stored in the search index, is assumed to be stored in the document storage unit 1.

Since the path to a search target document, which is recorded in the backup unit, is based on the rule determined by the backup unit, the backup unit 6 notifies in advance the search unit 3 or the search result output unit 5 of the conversion rule.

In the configuration shown in FIG. 8, the search unit 3 (step S504) converts the path.

In a modification of the second exemplary embodiment of the present invention, the system can behave like the CDP software in such a way that a reference target of a file that is hit in a past index is changed to the backup target.

In addition, in the search processing (steps S503 and S504 in FIG. 10) in the second exemplary embodiment of the present invention, a modification of the second exemplary embodiment is possible in which the old version of a document is hit in the search.

In the second exemplary embodiment of the present invention, if the index of the same document is included in multiple partitioned indexes, priority is given to the latest of the partitioned indexes in the range, read by the search unit 3, in steps S503 and S504 in FIG. 10 in the same way as in the first exemplary embodiment described above.

In a modification of the second exemplary embodiment of the present invention, the path (reference target) of a document that is hit in one of the partitioned indexes is changed to the corresponding storage target in the backup unit 6.

Multiple indexes of the same document, if hit, are presented as the search result.

All the paths of a document that is hit in the partitioned indexes may be changed to the corresponding path stored in the backup. Instead, it is also possible that, if the document is the latest (that is, if the document is not included in an index later than the partitioned index in which the document is hit), the path is not changed but the path stored in the document storage unit 1 is presented without conversion. If the document that is hit is included in the backup unit 6, the path of the document is changed to the corresponding storage target in the backup unit 6.

In the search system available today, the function to search backup data, created by the backup unit, requires the creation of an index to the backup data.

In contrast, this exemplary embodiment can implement the search function to backup data only by an index to the document storage unit 1.

This function eliminates the need for the index registration processing for backup data, thus reducing the storage capacity required for the index and the computer resources required for the calculation processing.

By changing the reference target of a document, which is hit in a past partitioned index, to the location of the document stored in the backup unit, the search system according to the present invention allows the past history to be accessed in the same way as in CDP. In addition, the ability to perform the search processing based on a past status allows a user to perform the search processing using, for example, a word that was present only at a point in time in the past.

Next, a third exemplary embodiment of the present invention will be described in detail with reference to the drawings. In the third exemplary embodiment of the present invention, past partitioned indexes are merged.

Figure 12:
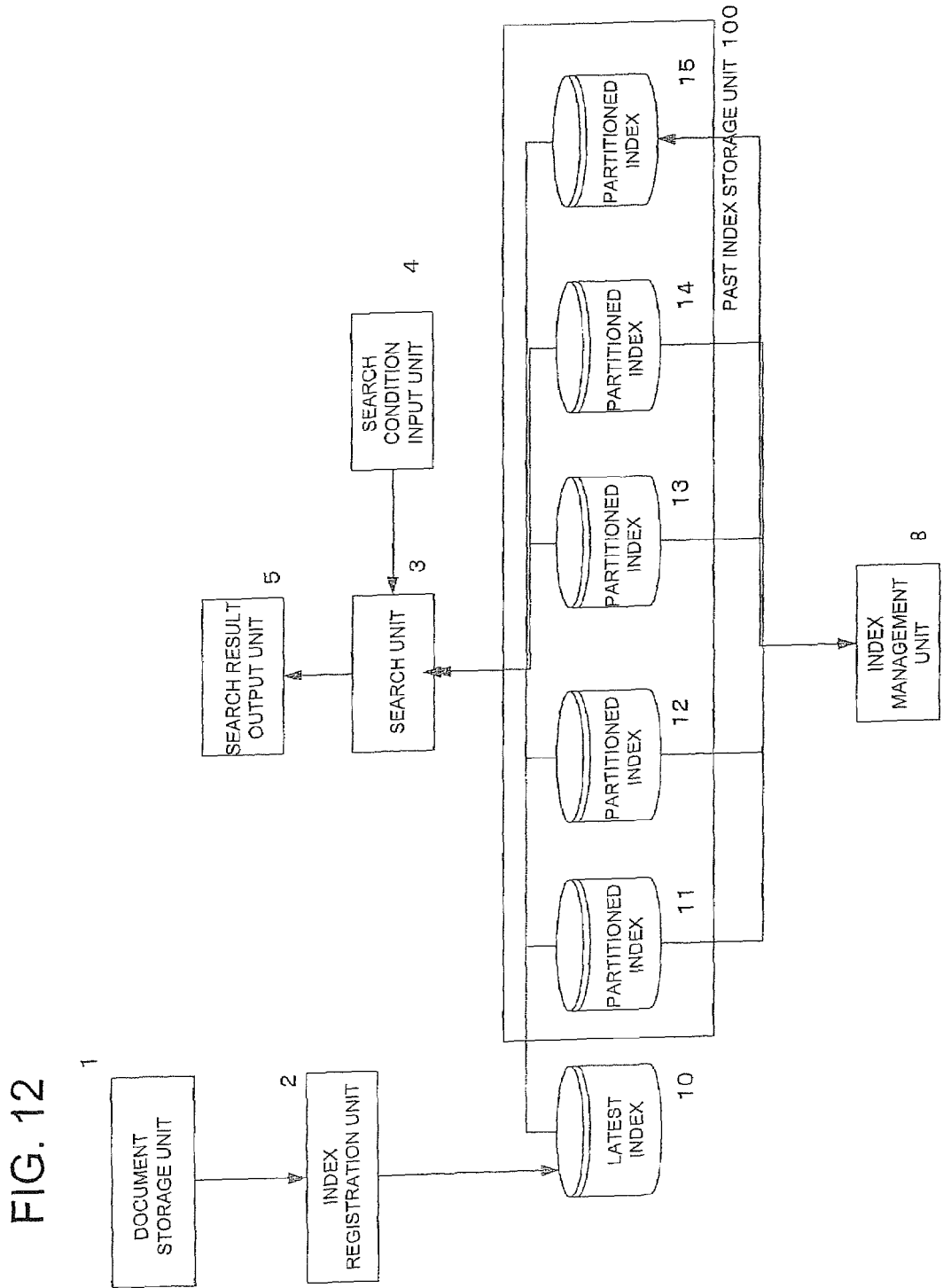
FIG. 12 is a block diagram showing the configuration of a third exemplary embodiment of the present invention.

Referring to FIG. 12, the third exemplary embodiment of the present invention comprises the components in the first exemplary embodiment shown in FIG. 1 and further comprises an index management unit 8.

The other part of the configuration is the same as that of the first exemplary embodiment and so the description is omitted here.

The third exemplary embodiment may also be implemented by adding the index management unit 8 to the second exemplary embodiment shown in FIG. 8.

The general operation of the index management unit 8 will be described. The index management unit 8 accesses one or more partitioned indexes to merge the partitioned indexes into one partitioned index.

For example, when the index is created using the inverted file method, merging multiple partitioned indexes means that multiple inverted files are converted into one inverted file by merging multiple pieces of index data on the same document into one latest index data.

Partitioned indexes are merged when one of the following conditions is satisfied.

when the number of partitioned indexes exceeds a predetermined number;

when the capacity of a partitioned index exceeds a predetermined capacity; and when a partitioned index has been used longer than a predetermined period of time.

Merging partitioned indexes according to this exemplary embodiment increases the search processing performance.

The reason is that merging partitioned indexes reduces the index inefficiency caused by reading multiple pieces of index data on the same document.

The following describes a modification of the third exemplary embodiment of the present invention.

In order to solve the problem of the modification of the first exemplary embodiment in which a past file is not hit during the search, if reading of a past partitioned index is interrupted halfway, this modification provides means that performs the operation of an index that acts like the cache of the computer. In this modification, the index management unit 8 performs the following function.

The index management unit 8 reads the latest index and the partitioned indexes 11-15, extracts several documents included in the indexes, and creates a new partitioned index.

This partitioned index, which is processed differently from ordinary partitioned indexes, is always read in the search processing, even if reading of a past partitioned index is stopped halfway.

The documents selected from the partitioned indexes are extracted according to a predetermined rule. For example, any of the following rules may be used.

Documents that are not updated for a fixed period of time but are frequently read by users are selected;

Documents specified by the user as important are selected; or

Documents that include specific keywords are selected.

The problem with the modification of the first exemplary embodiment is that a past file is sometimes not hit. In contrast, the modification of the third exemplary embodiment performs the processing described above to allow the documents, selected by the index management unit 8, to be always hit during the search even if those documents are not updated.

If information impossible or difficult to be recalculated later is recorded as the information (attribute information) recorded in the index in the exemplary embodiments described above or in their modifications, the information search based on the characteristics of the documents at a point in time in the past can be performed in the environment in the past according to the attribute of the index. Examples of information that is recorded in the index but is impossible or difficult to be recalculated later are numeric data such as keyword frequencies used for the search result ranking, scores indicating the importance of documents, and so on. This type of information at a point in time in the past, if recorded, makes it possible to output the same ranking search result as that in the past search time during a information search that will be performed later.

In the present invention, if only information possible to be recalculated later is recorded in the index, the information search on the documents at a point in time in the past can be executed efficiently. Here, "efficient execution of information search" means a reduction in the capacity of storage for storing complete past indexes or in the computation quantity for regenerating an index from the backup. An example of information possible to be recalculated later is information on the correspondence between a keyword and the documents in which the keyword occurs.

In case the above-described index information impossible to be recalculated (static score information) and the index information possible to be recalculated are stored in separate storage areas, the present invention may be applied by partitioning them on a time series basis. Although FIG. 1 shows the configuration in which one sequence of partitioned indexes (10-14) is provided with respect to the time axis, it is of course possible in this present invention to provide a configuration in which multiple sequences of partitioned indexes are provided with respect to the time axis. That is, the present invention may be applied to a system where indexes are stored in multiple storage areas. In this case, multiple sequences of partitioned indexes, each partitioned on a time series basis, are provided in multiple areas, one sequence for each area.

The following describes the effects of the exemplary embodiments described above.

(A) The search processing can be performed based on a past base point. The reason is that, in the exemplary embodiments described above, the indexes are partitioned into a plurality of partitioned indexes which are recorded on a time series basis to allow the search processing to be performed using only the indexes older than a past base point.

(B) The index addition/update processing can be performed at a high speed while achieving the effect described above. The reason is that the index requires less storage capacity, because the index for which the addition or update processing is performed in the exemplary embodiments described above is a partitioned index in which only additions/updates for a fixed period of time are recorded. So, this structure allows the index to be stored in a high-speed storage device (semiconductor memory, etc.), thus making it possible to speed up index addition/update processing.

(C) Further, the increase in the index storage capacity can be suppressed and reduced. This is because, though the conventional search processing based on a point in time in the past requires all index content in the past, the indexes are partitioned into a plurality of partitioned indexes in the exemplary embodiments described above to allow the index to be changed based on the entered base point information.

(D) Furthermore, there is no need to create an index for the backup data. The reason is that, in the exemplary embodiments described above, the index partitioning trigger time and the backup creation trigger time are set equal and the reference target of the search result is changed to the backup data to eliminate the need for preparing an index separately for searching the backup data. This method eliminates the need for the index registration processing to be performed for the backup data, thereby reducing the storage capacity of the backup device necessary for the indexing processing and the computer resources of the backup device necessary for the calculation processing.

The present invention is applicable to the information search system such as:

Information search system on World Wide Web; and

Information in an organization (information stored on an Intranet web and information in an information system, database, and storage in an organization).

That is, the present invention may of course be applied in such a way that a search engine comprises the information search system in the exemplary embodiments described above.

The present invention is applicable also to an information processing system that has intermediate data for analysis.

The present invention is applicable also to a search system used for searching backup or archive data. For example, a mining device, which performs data mining processing or text mining processing, may comprise the information search system of the present invention according to claim 1 and so on. Alternatively, a portable communication terminal (mobile phone) may comprise the information search system of the present invention according to claim 1 and so on; a medium playback device that plays back music (sound)/image (video) may comprise the information search system of the present invention according to claim 1 and so on; a device that manages a list of names may comprise the information search system of the present invention according to claim 1 and so on; a karaoke device may comprise the information search system of the present invention according to claim 1 and so on. If configured to allow information to be searched for based on the attribute information at a point in time in the past according to the index attribute, those devices enable the user to reach the same information in the same way as in the past if the search operation is performed in the same way as in the past.

While the present invention has been described with reference to the exemplary embodiments above, it is to be understood that the present invention is not limited to the configuration of the exemplary embodiments above and that modifications and changes that may be made by those skilled in the art within the scope of the present invention are included.

The invention claimed is:

1. An information search system comprising:
   a document storage unit in which documents are stored; and
   an index registration unit to register a partitioned index that is partitioned on a time series basis, as an index for information search, to read a document to be registered in the partitioned index, to perform predetermined preparatory processing necessary for registration in the partitioned index, and if information on the document to be registered is not included in the partitioned index that is a registration target, to add index registration information obtained by performing the predetermined preparatory processing to the partitioned index that is the registration target,
   wherein, if a document is deleted, a null is registered as information of the deleted document in the latest partitioned index of the multiple partitioned indexes and the other partitions are not modified.

2. The information search system according to claim 1, further comprising:
   a search condition input unit to receive time or trigger information that is a search base point, as a search condition; and
   a search unit that to select corresponding partitioned indexes from a plurality of partitioned indexes that are partitioned on a time series basis, based on the search condition and to perform a search using the selected partitioned index.

3. The information search system according to claim 1, wherein,
   if information on a document to be registered is included in the partitioned index that is a registration target, the index registration unit is to update the partitioned index that is the registration target, using index registration information obtained in the preparatory processing.

4. The information search system according to claim 1, further comprising
   a partitioning trigger notification unit to notify the index registration unit of a trigger for index partitioning and registration.

5. The information search system according to claim 1, further comprising
   a unit to notify the index registration unit of a trigger for index partitioning and registration, in association with a backup of a document, for which an index is created.

6. The information search system according to claim 1, wherein
   the index registration unit is to read a document to be registered in an index, from document storage unit in which documents are stored, is to perform predetermined preparatory processing necessary for index registration, and is to register index data in a latest index, and when performing index partitioning, the index registration unit is to judge whether or not a trigger for index partitioning is satisfied and, if the index partitioning trigger is satisfied, is to set index data stored in a current latest index, in one of partitioned indexes, and then is to create a latest index as a null and set the null latest index as an index registration target of the index registration unit.

7. The information search system according to claim 1, wherein the partitioned index recorded in the index storage unit includes predetermined attribute information utilized in an information search at a point in time in the past, and an information search result based on the attribute information at the point in time in the past is output by selecting and searching a partitioned index corresponding to the point in time in the past.

8. The information search system according to claim 1, further comprising:

a backup unit of the document storage unit; and a unit to notify the index registration unit of a trigger for index partitioning in association with a backup of the document storage unit.

9. The information search system according to claim 8, further comprising a unit to set a path of a document to a storage target, determined by the backup unit, when presenting the search result.

10. The information search system according to claim 1, wherein the partitioned index holds score information on a document.

11. The information search system according to claim 1, further comprising an index management unit to merge the partitioned indexes.

12. An information search system comprising:

a search condition input unit to receive, as a search condition, time or trigger information as a search base point;

a search unit to select a corresponding partitioned index from a plurality of partitioned indexes that are partitioned on a time series basis, as an index for information search, based on the search condition, and to perform a search using the selected partitioned index, wherein, if a document is deleted, a null is registered as information of the deleted document in the latest partitioned index of the multiple partitioned indexes and the other partitions are not modified.

13. The information search system according to claim 12, wherein:

when index data on the same document is stored in a plurality of indexes, the search unit is to perform processing with priority given to a later index.

14. The information search system according to claim 12, wherein if information on the search base point is not specified, the search unit is to perform search processing using a latest index and all past partitioned indexes registered in the index storage unit.

15. A method of information search comprising an index registration step, performed by a processor of a computing device, of registering information in a partitioned index, which is partitioned on a time series basis, as an index for information search, the index registration step including:

reading, by the processor, a document to be registered in an index, from a document storage unit in which documents are stored;

performing, by the processor, predetermined preparatory processing necessary for registration in an partitioned index; and if information on a document to be registered is not included in a partitioned index which is a registration target, adding, by the processor, index registration information, which is obtained in the preparatory processing, to the partitioned index which is a registration target, wherein, if a document is deleted, a null is registered as information of the deleted document in the latest partitioned index of the multiple partitioned indexes and the other partitions are not modified.

16. The method of information search according to claim 15, further comprising:

receiving, as a search condition, time or trigger information, which is a search base point; and selecting a corresponding partitioned index from a plurality of partitioned indexes, partitioned on a time series basis, based on the search condition and performing a search using the selected partitioned index.

17. The information search method according to claim 15, wherein, if information on a document to be registered is included in the partitioned index which is a registration target, the index registration step updates the partitioned index which is a registration target, using index registration information which is obtained in the preparatory processing.

18. The information search method according to claim 15, wherein if no information on a search base point time is specified, a search is performed, using all indexes registered in the index storage unit.

19. The information search method according to claim 15, further comprising notifying the index registration step of a trigger for index partitioning to interact with backing up of the information.

20. The information search method according to claim 15, further comprising notifying the index registration step of a trigger for index partitioning in association with a backup of a search target document.

21. A method of information search comprising:

receiving, by a processor of a computing device, as a search condition, time or trigger information, which is a search base point; and selecting, by the processor, a corresponding partitioned index from a plurality of partitioned indexes, partitioned on a time series basis, as an index for information search based on the search condition and performing a search using the selected partitioned index, wherein, if a document is deleted, a null is registered as information of the deleted document in the latest partitioned index of the multiple partitioned indexes and the other partitions are not modified.

22. The information search method according to claim 21, wherein when index data on the same document are stored in a plurality of indexes, the search processing is performed with priority given to a later index.

23. A program stored on a non-transitory computer-readable medium for causing a computer to execute index registration processing of registering information in a partitioned index, partitioned on a time series basis, as an index for information search, the index registration processing including:
reading a document to be registered in the index, from document storage unit in which documents are stored;
performing predetermined preparatory processing necessary for registration in the index; and
if information on a document to be registered is not included in a partitioned index which is a registration target,
adding index registration information, which is obtained in the preparatory processing, to the partitioned index which is a registration target,
wherein, if a document is deleted, a null is registered as information of the deleted document in the latest partitioned index of the multiple partitioned indexes and the other partitions are not modified.

24. The program according to claim 23, further causing a computer to execute the processing comprising:
receiving, as a search condition, time or trigger information, which is a search base point; and
selecting a corresponding partitioned index from a plurality of partitioned indexes, partitioned on a time series basis, based on the search condition and performing a search using the selected partitioned index.

25. The program according to claim 23, wherein,
if information on a document to be registered is present in the partitioned index which is a registration target, the index registration processing updates the partitioned index which is a registration target, using index registration information which is obtained in the preparatory processing.

26. A program stored on a non-transitory computer-readable medium for causing a computer to execute the processing comprising:
receiving, as a search condition, time or trigger information, which is a search base point; and
selecting a corresponding partitioned index from a plurality of partitioned indexes, partitioned on a time series basis, based on the search condition and performing a search using the selected partitioned index,
wherein, if a document is deleted, a null is registered as information of the deleted document in the latest partitioned index of the multiple partitioned indexes and the other partitions are not modified.

27. The program according to claim 26, wherein
when index data on the same document are stored in a plurality of indexes, the search processing is performed with priority given to a later index.

* * * * *